Oct. 10, 1961  E. R. BOWERMAN, JR., ET AL  3,004,190
ENCODER
Filed Oct. 26, 1959  3 Sheets-Sheet 3

INVENTORS
EDWIN R. BOWERMAN JR
MOE WASSERMAN
BY
ATTORNEY

3,004,190
ENCODER

Edwin R. Bowerman, Jr., Whitestone, and Moe Wasserman, Massapequa Park, N.Y., assignors to Sylvania Electric Products Inc., a corporation of Delaware
Filed Oct. 26, 1959, Ser. No. 848,862
11 Claims. (Cl. 315—201)

A signal encoder is an electrical device which converts one or more discrete input signals into a coded combination of output signals. To this end, an encoder is provided with a set of input terminals and a set of output terminals. In the absence of an input signal, the encoder produces no output signals. However, when an input signal is supplied to any input terminal, an output signal will appear at one or more output terminals. (This signal can take many different forms, as for example, a change in impedance level or a voltage change.) The number and relative positions of these output terminals uniquely identify the selected input terminal. Stated differently, there is one-to-one correspondence between the particular input terminal to which the incoming signal is supplied, and the particular combination of output terminals at which the output signals appear.

It is an object of our invention to provide a new type of signal encoder which does not employ the conventional tube, transistor, diode, and other similar components heretofore required, but rather utilizes an electrically non-linear material.

Another object is to provide a new type of signal encoder employing, together with input and output terminals, a material having a voltage-current characteristic which does not satisfy Ohm's law.

Another object of our invention is to provide an electronic encoder which can be fabricated simply and inexpensively as an integral unit.

In accordance with the principles of our invention, we employ a layer of electrically non-linear material, i.e. a layer which, in response to a voltage applied thereto, exhibits an electrical impedance which decreases as the voltage is increased. A first set electrode consisting of parallel separate electrodes having varying lengths is secured to one surface of the layer, the electrodes in the first set being arranged in columns. A second electrode set consisting of parallel separate electrodes having varying lengths is secured to the opposite surface of the layer, the electrodes in the second set being arranged in rows. Each row or column may be in the form of a single electrode element or can take the form of two or more separate, aligned electrode elements. The electrodes in one set, for example the electrode columns, are designated as input terminals. The electrodes in the other set, for example, the electrode rows, are designated as output terminals.

An incoming voltage is applied between a selected input terminal and a common terminal. As a consequence, the individual impedance of each of the output terminals (as measured between each output termnal and the common terminal) will vary. In particular, certain output terminals will be high impedance terminals while others will be low impedance terminals. In the absence of an incoming voltage, all output terminals are high impedance terminals.

As the incoming voltage is applied between one or another input terminal and the common terminal, the number and relative positions of the low impedance output terminals change accordingly. Thus, the number and relative positions of the low impedance output terminals uniquely identify the particular input terminal to which the incoming voltage is supplied.

Illustrative embodiments of our invention will now be described in detail with reference to the accompanying drawings, wherein.

Figure 1:
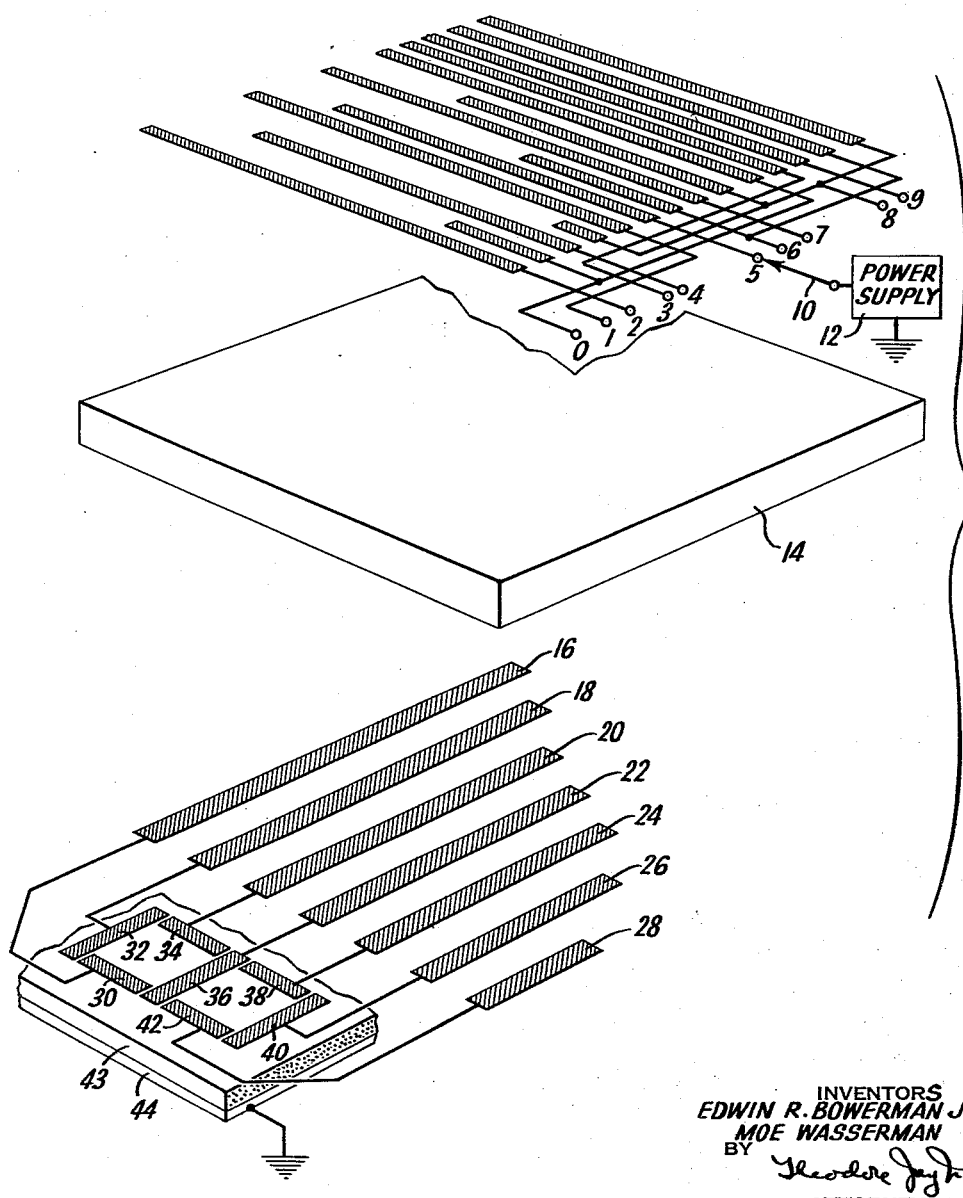
FIG. 1 shows one type of signal encoder in accordance with the invention.

Referring now to FIG. 1, there is shown a layer of electrical non-linear material 14. This layer in response to a voltage applied thereto displays an electrical impedance (primarily resistive) which decreases as the voltage increases. This layer can be, for example, composed of glass enamel embedded cadmium sulfide activated with between $0$–$2.4 \times 10^{-4}$ gram atoms of copper per mole of sulfide, as set forth in more detail in the copending patent application of Moe Wasserman, Serial No. 796,156, filed February 27, 1959.

Secured to the top surface of layer 14 are a plurality of separate, generally horizontal electrodes (formed for example of tin oxide), some of which have equal lengths, other having longer or shorter lengths. A switch 10 connects a power supply 12 to a selected one of ten different input terminals, numbered respectively 0 to 9. Each terminal is connected to one or more of the horizontal electrodes.

Secured to the bottom surface of layer 14 are seven different vertical electrodes, numbered 16–28 respectively. These electrodes also vary in length.

We further provide a numerical display device including an electroluminescent layer 43. The bottom surface of layer 43 is covered with a grounded conductive film 44. Placed above the electroluminescent layer 43 are seven different transparent electrically conductive segments, numbered 30–42 respectively. Each of the vertical electrodes 16–28 is connected to a corresponding one of the conductive segments 30–42.

Application of a voltage between one or more of segments 30–42 and the conductive film 44 will produce one or more bars of light corresponding to the segment or segments across which the voltage is received. By suitably selecting one or more bars to be illuminated, any digit from 0 to 9 can be displayed. When the arm of switch 10 is applied to any of the terminals numbered 0 to 9, a voltage will be applied between one or more of the horizontal electrodes and one or more of the vertical electrodes. Due to the non-linear properties of the layer, one or more segments 30–42 will be connected through a very low impedance to the power supply. Consequently, the desired number in the electroluminescent display device will be visually displayed against a dark background. Hence the arrangement of FIG. 1 converts an input signal representing decimal information and applied to a selected one of the terminals of switch 10 to an output signal in the form of a seven segment output code, the output code being displayed visually in the form of bars of light forming any digit from 0 to 9.

Figure 3:
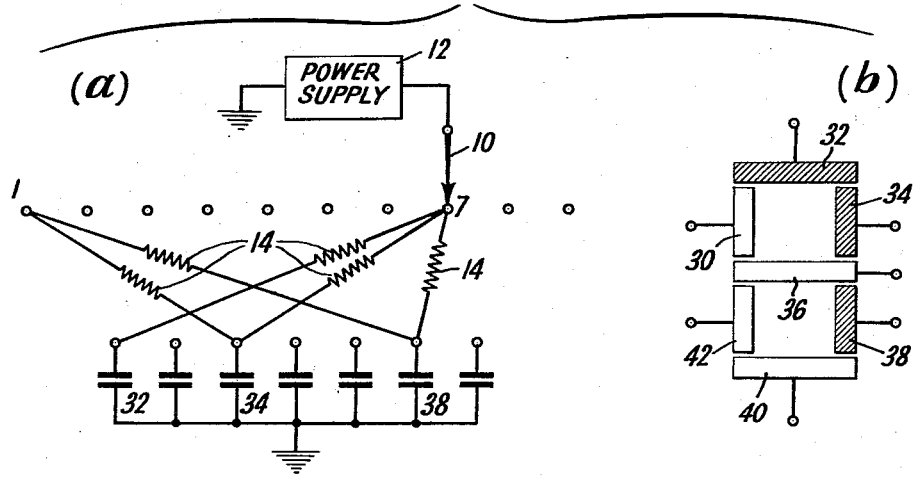
FIG. 3 shows a portion of the equivalent electrical circuit of the encoder of FIG. 1.

The equivalent electrical circuit for the device shown in FIG. 1 is shown in FIG. 3. When it is desired to display the number 1, the arm of switch 10 is connected through terminal 1. This voltage then is applied through one thickness of layer 14 to segments 34 and 38. Since the layer has the non-linear properties previously indicated, the resistance of the layer (indicated as a separate resistor 14 in FIG. 3), is low and essentially all the voltage of the power supply appears in parallel at segments 34 and 38 and the number 1 is displayed.

In addition, as can be seen from FIG. 3, an undesired circuit is completed between terminal 1 and segment 32. However, if the electrical circuit of this undesired connection is traced, it will be seen that the incoming voltage is effectively applied across three separate non-linear resistors connected in series. Due both to the voltage divider action of these resistors and the non-linear properties of these resistors, the resistance of each of these three resistors is extremely high. As a consequence, the voltage applied through this undesired circuit to segment 32 is insufficient to actuate this segment.

Figure 2:
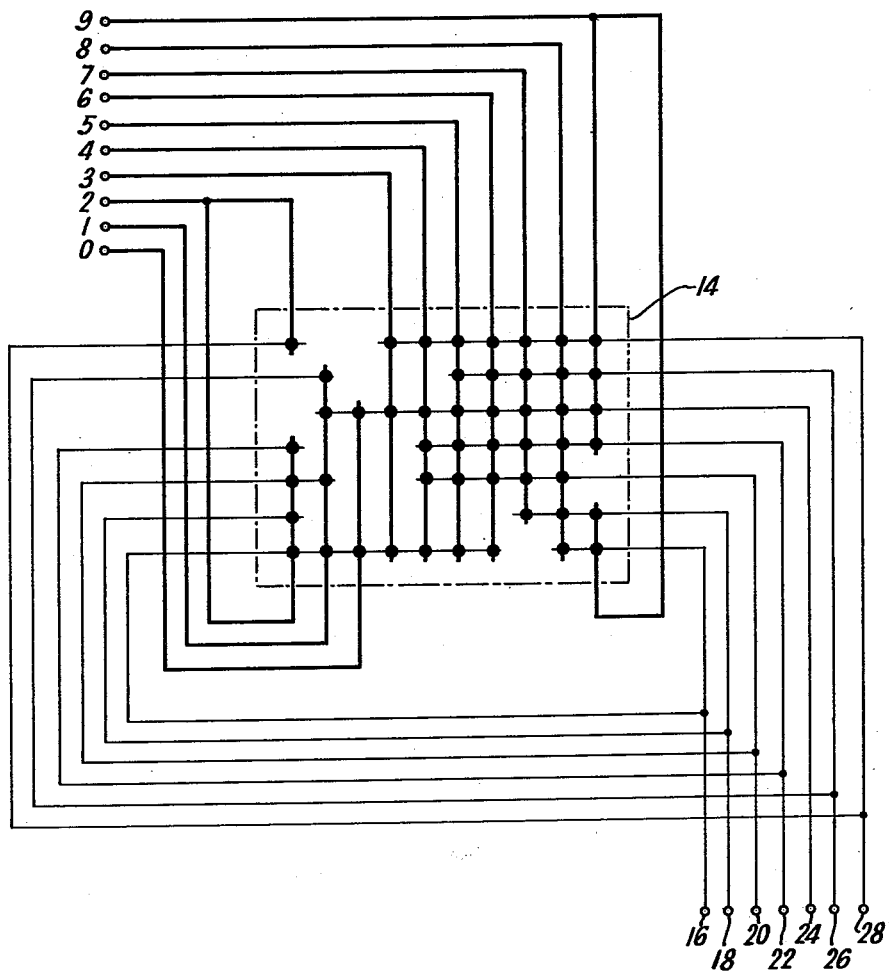
FIG. 2 shows an alternative electrode arrangement for the encoder shown in FIG. 1.

FIG. 2 shows another form of signal encoder which can replace the signal encoder of FIG. 1. The only difference is that in FIG. 1 the vertical and horizontal electrodes are continuous, though of different lengths. In the device of FIG. 2, the electrodes are not only of unequal lengths, but also each electrode can be composed of either one continuous segment or of two physically separated electrode sections. Note that in the device of FIG. 2, when any two sections of any one electrode are physically separated, these sections are electrically tied together in positions external to the layer 14. For ease of illustration, the vertical electrodes of FIG. 2 are shown as relatively thick lines while the horizontal electrodes are shown as relatively thin lines.

As in the device of FIG. 1, when an incoming voltage is applied between one or another input terminal 0 to 9 of the device of FIG. 2 and a common terminal, the impedance of certain output terminals 16–28 (as referred to the common terminal) will be low, while the impedance of the remaining output terminals will be high. The number and positions of the low impedance terminals uniquely identify the input terminal to which the incoming voltage is supplied.

Figure 4:
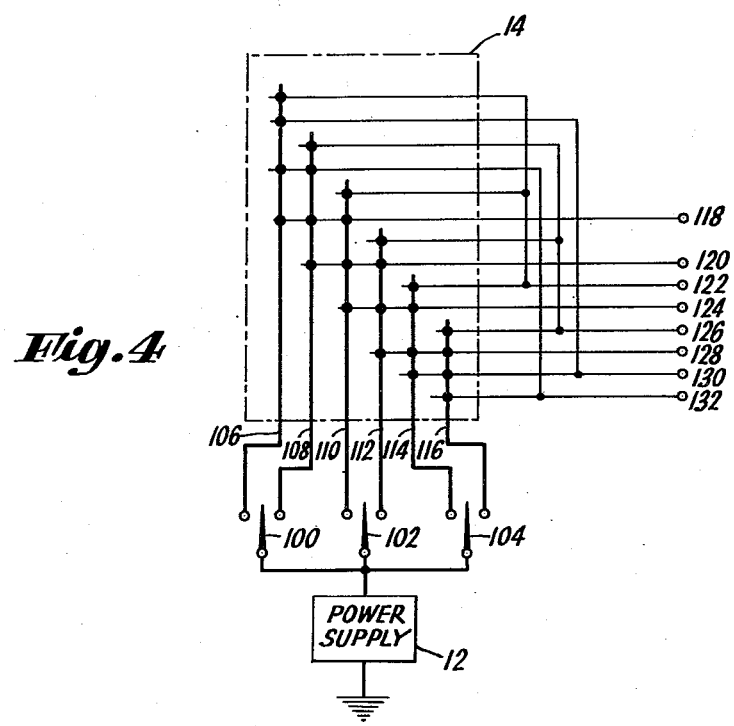
FIG. 4 shows another type of signal encoder.

FIG. 4 shows another type of encoder for converting an input signal in binary form to an output signal in decimal form. This is accomplished by means of the two-position switches 100, 102 and 104, the arms of which pass through a power supply to ground. Switch 100 applies a voltage depending upon its position either to vertical electrode 106 or vertical electrode 108. Similarly, switch 102 applies a voltage to vertical electrode 110 or vertical electrode 112, and switch 114 applies a voltage either to vertical electrode 114 or vertical electrode 116. There are further shown eight output terminals connected to the horizontal electrodes and numbered 118–132 respectively. The switches 100, 102 and 104 are capable, depending upon their positions, of representing any of the following binary numbers, 000—001—010—011—100—101—110—111. Corresponding to each one of these binary numbers, a voltage will appear on the selected one of terminals 118–132. Stated differently, these output terminals respectively represent decimal numbers from 0 to 7. Depending upon the binary numbers represented by the position of the switches, the appropriate one of the output electrodes representing the corresponding decimal digit will be connected through a very high impedance path to the power supply, while all other output electrodes will be connected through low impedance paths to the power supply.

Note that the device of FIG. 4 can be also used to convert a decimal coded input signal to a binary coded output signal by using the output terminals 0 to 7 as input terminals, and the switch terminals connected to electrodes 106–116 as output terminals. The binary code is represented by the particular electrodes of the group 106–116 which represent low impedance paths.

It will be apparent that, in our invention, various types of code conversions are accomplished by changing the number of electrodes used and by varying the lengths of these electrodes, the non-linear layer itself remaining unchanged (except for dimensional variations).

What is claimed is:

1. A signal encoder comprising an electrically non-linear layer consisting of cadmium sulfide powder embedded in glass, said layer, when a voltage is applied thereto, exhibiting an electrical impedance which decreases as said voltage increases; a first set of parallel electrodes secured to one surface of said layer and arranged in columns, certain of said first set electrodes having differing lengths; and a second set of parallel electrodes secured to the other surface of said layer and arranged in rows, certain of said second set electrodes having differing lengths.

2. A signal encoder comprising an electrically non-linear layer consisting of cadmium sulfide powder embedded in glass, said layer, when a voltage is applied thereto, exhibiting an electrical impedance which decreases as said voltage increases; a first set of parallel electrodes secured to one surface of said layer and arranged in columns, certain of said first set electrodes having differing lengths; and a second set of parallel electrodes secured to the other surface of said layer and arranged in rows, certain of said second set electrodes having differing lengths, all of said electrodes being continuous and unbroken.

3. A signal encoder comprising an electrically non-linear layer, consisting of cadmium sulfide powder embedded in glass, said layer, when a voltage is applied thereto, exhibiting an electrical impedance which decreases as said voltage increases; a first set of parallel electrodes secured to one surface of said layer and arranged in columns, certain of said first set electrodes having differing lengths; and a second set of parallel electrodes secured to the other surface of said layer and arranged in rows, certain of said second set electrodes having differing lengths, certain of said electrodes being constituted by at least two separate electrode sections.

4. A signal encoder comprising an electrically non-linear layer consisting of cadmium sulfide powder embedded in glass, said layer, when a voltage is applied thereto, exhibiting an electrical impedance which decreases as said voltage increases; a first set of parallel electrodes secured to one surface of said layer and arranged in columns, certain of said first set electrodes having differing lengths; a second set of parallel electrodes secured to the other surface of said layer and arranged in rows, certain of said electrodes being constituted by at least two separate electrode sections; and individual means associated with each of said certain electrodes to electrically connect the electrode sections of said each electrode.

5. A signal encoder comprising an electrically non-linear layer consisting of cadmium sulfide powder embedded in glass, said layer, when a voltage is applied thereto, exhibiting an electrical impedance which decreases as said voltage increases; a first set of parallel electrodes secured to one surface of said layer and arranged in columns, certain of said first set electrodes having differing lengths; a second set of parallel electrodes secured to the other surface of said layer and arranged in rows, certain of said second set electrodes having differing lengths; a plurality of input terminals coupled to the electrodes of one of said first and second sets; and another plurality of output terminals coupled to the electrodes of the other of said first and second sets.

6. A signal encoder comprising an electrically non-linear layer consisting of cadmium sulfide powder embedded in glass, said layer, when a voltage is applied thereto, exhibiting an electrical impedance which decreases as said voltage increases; a first set of parallel electrodes secured to one surface of said layer and arranged in columns, certain of said first set electrodes having differing lengths; a second set of parallel electrodes secured to the other surface of said layer and arranged in rows, certain of said second set electrodes having differing lengths; a plurality of input terminals coupled to the electrodes of one of said first and second sets; another plurality of output terminals coupled to the electrodes of the other of said first and second sets; an additional terminal; and means to apply an incoming voltage between at least one selected input terminal and said additional terminal to reduce the impedance of at least one selected output terminal as measured with respect to said additional terminal to a low value, the impedances of all unselected output terminals being at high values.

7. A signal encoder comprising an electrically nonlinear layer consisting of cadmium sulfide powder embedded in glass, said layer, when a voltage is applied thereto, exhibiting an electrical impedance which decreases as said voltage increases; a first set of parallel electrodes secured to one surface of said layer and arranged in columns, certain of said first set electrodes having differing lengths; a second set of parallel electrodes secured to the other surface of said layer and arranged in rows, certain of said second set electrodes having differing lengths; a plurality of input terminals coupled to said first set electrodes, said plurality being less than the number of electrodes in said first set; and another plurality of output terminals coupled to said second set electrodes, the number of electrodes in said second set being equal to said another plurality.

8. A signal encoder comprising an electrically nonlinear layer consisting of cadmium sulfide powder embedded in glass, said layer, when a voltage is applied thereto, exhibiting an electrical impedance which decreases as said voltage increases; a first set of parallel electrodes secured to one surface of said layer and arranged in columns, certain of said first set electrodes having differing lengths; a second set of parallel electrodes secured to the other surface of said layer and arranged in rows, certain of said second set electrodes having differing lengths; a plurality of input terminals coupled to said first set electrodes, said plurality being less than the number of electrodes in said first set; another plurality of output terminals coupled to said second set electrodes, the number of electrodes in said second set being equal to said another plurality; and an electroluminescent display device having a plurality of individual electroluminescent display elements equal in number to said another plurality, each element being coupled to a corresponding output terminal.

9. A signal encoder comprising an electrically nonlinear layer consisting of cadmium sulfide powder embedded in glass, said layer, when a voltage is applied thereto, exhibiting an electrical impedance which decreases as said voltage increases; a first set of parallel electrodes secured to one surface of said layer and arranged in columns, certain of said first set electrodes having differing lengths; a second set of parallel electrodes secured to the other surface of said layer and arranged in rows, certain of said second set electrodes having differing lengths; and a display device having a plurality of display elements equal in number to the number of electrodes in a selected one of said first and second sets, each element being coupled to a corresponding electrode in said selected set.

10. A signal encoder comprising an electrically nonlinear layer consisting of cadmium sulfide powder embedded in glass, said layer, when a voltage is applied thereto, exhibiting an electrical impedance which decreases as said voltage increases; a first set of parallel electrodes secured to one surface of said layer and arranged in columns, certain of said first set electrodes having differing lengths; a second set of parallel electrodes secured to the other surface of said layer and arranged in rows, certain of said second set electrodes having differing lengths; a common terminal; a plurality of input terminals coupled to the electrodes of one of said first and second sets; another and different plurality of output terminals coupled to the electrodes of the other of said first and second sets; and an electroluminescent display device having said another plurality of individual display elements, each element being coupled between a corresponding output terminal and said common terminal.

11. A signal encoder comprising an electrically nonlinear layer consisting of cadmium sulfide powder embedded in glass, said layer, when a voltage is applied thereto, exhibiting an electrical impedance which decreases as said voltage increases; a first set of parallel electrodes secured to one surface of said layer and arranged in columns, certain of said first set electrodes having differing lengths; a second set of parallel electrodes secured to the other surface of said layer and arranged in rows, certain of said second set electrodes having differing lengths; a common terminal; a plurality of input terminals coupled to the electrodes of one of said first and second sets; another and different plurality of output terminals coupled to the electrodes of the other of said first and second sets; an electroluminescent display device having said another plurality of individual display elements, each element being coupled between a corresponding output terminal and said common terminal; and means to apply an incoming voltage between at least a selected one of said input terminals and said common terminal whereby selected ones of said display elements, uniquely identifying the selected input terminal, are energized.

No references cited.